US012674732B2

(12) United States Patent
Roberts et al.

(10) Patent No.: US 12,674,732 B2
(45) Date of Patent: Jul. 7, 2026

(54) PIPE TESTING APPARATUS AND METHOD

(71) Applicant: VERDERG PIPE TECHNOLOGY LIMITED, Woking Surry (GB)

(72) Inventors: Peter Roberts, Woking (GB); Richard Stuart, Woking (GB); Robert Kettle, Woking (GB)

(73) Assignee: Verderg Limited, Woking Surrey (GB)

( * ) Notice: Subject to any disclaimer, the term of this patent is extended or adjusted under 35 U.S.C. 154(b) by 211 days.

(21) Appl. No.: 18/036,190

(22) PCT Filed: Oct. 22, 2021

(86) PCT No.: PCT/GB2021/052744
§ 371 (c)(1),
(2) Date: May 10, 2023

(87) PCT Pub. No.: WO2022/101605
PCT Pub. Date: May 19, 2022

(65) Prior Publication Data
US 2024/0011878 A1     Jan. 11, 2024

(30) Foreign Application Priority Data

Nov. 10, 2020     (GB) ...................................... 2017701

(51) Int. Cl.
*G01N 3/12* (2006.01)
*G01N 3/02* (2006.01)
*G01N 3/10* (2006.01)

(52) U.S. Cl.
CPC ................. *G01N 3/12* (2013.01); *G01N 3/02* (2013.01); *G01N 2203/0232* (2013.01); *G01N 2203/0274* (2013.01)

(58) Field of Classification Search
CPC .... G01N 3/12; G01N 3/02; G01N 2203/0232; G01N 2203/0274; G01N 3/10;
(Continued)

(56) References Cited

U.S. PATENT DOCUMENTS 4,192,194 A     3/1980 Holt
2004/0079167 A1* 4/2004 Boyko ..................... G01N 3/10
73/825

(Continued)

FOREIGN PATENT DOCUMENTS

CN      109596432      4/2019
WO      2020138145 A1  2/2020

OTHER PUBLICATIONS

European Patent Office Examination Report, Aug. 1, 2024.

*Primary Examiner* — Brandi N Hopkins
(74) *Attorney, Agent, or Firm* — Woods Rogers PLC; Timothy Bechen; Nathan Evans

(57)     ABSTRACT
An apparatus for testing rings cut from pipes, comprising: a plurality of test chamber sections which, when placed together, define a test chamber for receiving the ring to be tested, the test chamber sections comprising at least a first test chamber section defining a first inner face of the test chamber and a second test chamber section defining an opposed second inner face of the test chamber, the first and second inner faces defining annuli arranged to contain the ring to isolate the inside of the ring from the outside; means for clamping the test chamber sections together to form the chamber; a fluid inlet port in one of the chamber sections to allow a pressurized fluid to be admitted to the chamber outside the ring when received in the chamber; and one or more sensors for measuring strain and deformation of the ring and fluid pressure.

19 Claims, 5 Drawing Sheets

(58) Field of Classification Search

CPC .... G01N 3/04; G01M 3/2861; G01M 5/0025;
G01M 3/022; G01M 3/223; G01M 3/005;
G01M 3/2884; G01M 3/2823; G01M
3/2853; G01M 3/36; G01M 3/2807;
G01M 3/04; F16L 1/26; F16L 55/00;
F16L 33/01; F16L 17/10; F16L 55/115;
F16L 21/00; F16L 39/00; F16L 23/167;
G01B 5/06; Y02P 90/70; E21B 47/117

USPC .......................................................... 73/37

See application file for complete search history.

(56) References Cited

U.S. PATENT DOCUMENTS

| | | |
|---|---|---|
| 2009/0223301 A1 | 9/2009 | Schwab |
| 2010/0212405 A1 | 8/2010 | Roberts et al. |
| 2020/0132576 A1 | 4/2020 | Robers et al. |

* cited by examiner

DETAIL C

PIPE TESTING APPARATUS AND METHOD

The present application is the National-stage filing of and relies on the disclosures of and claims priority to and the benefit of PCT Patent Application PCT/GB2021/052744 filed Oct. 22, 2021 with an original priority date of Nov. 10, 2020 based on GB Patent App. 2017701.0, the disclosures of which are hereby incorporated by reference herein in their entireties.

The present disclosure relates to an apparatus for testing pipes such as those used for forming underwater pipelines and to a method of pipe testing using the apparatus.

There has been a progressive development of very deep water reservoirs of gas and/or oil around the world. Until quite recently, very deep water was defined to be any depth greater than about 1000 m. However, so many pipelines have been installed in depths greater than this that the definition of very deep water is now beyond 2000 m.

The pipelines are typically installed empty, i.e. filled with air at ambient pressure and only filled with oil or gas under pressure once installation is completed. A major risk experienced during the installation of these deep-water pipelines is from the pressure applied by the water causing the pipe to deform out of its initial round shape and deform into an almost flat configuration. This is called external pressure collapse and if not controlled can result in the total loss of the pipeline. The dimensions, i.e. diameter and wall thickness, and also the material properties, of a very deep-water pipeline are therefore constrained by the potential for external pressure collapse.

This is in complete contrast to the design of a conventional shallow-water or onshore pipeline where the wall thickness is sized to resist internal pressure from the fluid it is to carry rather than external pressure.

Various theoretical studies of external pressure collapse have been carried out and numerical modelling has also been used to calculate the maximum water depth at which a pipeline with specified dimensions can safely be installed. However, the consequences of external pressure collapse are so great that these theoretical studies are not sufficient for confident management of the risk. Also, the most important method for reducing the potential for such local collapse, by increasing the wall thickness of the pipe, is so expensive and possibly not technically realisable, that the proposed pipeline might well not be commercially feasible. This in turn raises the possibility that the exploitation of the gas or oil reservoirs are abandoned.

The alternative to basing all design on the results from theory is to additionally carry out tests. Indeed, historically, several tests were carried out for a range of pipe wall thicknesses. These tests involved placing a complete pipe length of specially fabricated pipe in special pressure chambers and increasing the external pressure until collapse occurred. There remain a very limited number of laboratories with suitable facilities available and the tests are very expensive.

Codes have been prepared to provide a basis for the calculation of the dimensions for pipes that are required to operate at specified great depths. These codes encompass safety factors that are intended to ensure that the natural variations in pipe dimensions and material properties that occur during the manufacture of a pipeline that could be 1000 km long will not undermine the capacity of the pipeline to withstand the external pressure without collapse occurring. However, the factors are based on the few previous available complete pipe length collapse tests; the possibility of carrying out such tests on complete pipe lengths (otherwise known in the industry as "pipe joints") during fabrication of the pipe are not realistic since the tests take a significant time to be set up and completed and of course such tests destroy the tested pipe.

Only one pipe joint of a pipeline needs to collapse to flood or otherwise incapacitate the whole line. There is a direct analogy with "the weakest link in the chain" as regards pipeline failure due to external pressure collapse. Given that the codes of practice were based on the collapse test results of a small finite number of joints of line pipe, the design codes introduce factors to allow for all possible variation of the many parameters that affect the collapse pressure to increase the wall thickness down the whole deep water route.

More recently improved test methods have been developed aimed at replicating the effects of external pressure to cause the collapse of pipe joints and which are easy (and dramatically more cost effective than the historical test methods) to set up and complete.

These improved test methods are based on the recognition that the deformations that lead to external pressure collapse are uniform along the pipe and that therefore the occurrence of external pressure collapse will be the same for a ring cut from the pipe as for the complete pipe joint length of pipe that is subjected purely to external pressure.

A prior art pipe testing apparatus for use implementing the improved test methods is known from WO 2008/114049.

This pipe testing apparatus has proved highly effective for testing thick walled pipes for very deep water. A problem has arisen, however, in the testing of pipes that suffer what is commonly characterised as elastic buckling collapse under extreme hydrostatic loading, such as pipes having a diameter (D) to wall thickness (T) measure of D/T≥25, which pipes may be used at lower depths, including depths of between 150 and 1000 m. Moreover, a level of expertise and precision is required in the implementation of these test methods. The tests are typically conducted in pipe testing laboratories by highly skilled technicians.

The present invention arose in a bid to provide an improved pipe testing apparatus allowing for the non-destructive testing of pipes prone to suffering elastic buckling collapse under extreme hydrostatic loading and also in a bid to provide an improved pipe testing apparatus allowing for the non-destructive testing of pipes that could be implemented effectively outside of dedicated testing laboratories, allow for accurate repeatable operation by less-skilled individuals, and allow for a higher throughput of test specimens, irrespective of the wall thickness or other characteristics of the pipe to be tested.

Representative features are set out in the following clauses, which stand alone or may be combined, in any combination, with one or more features disclosed in the text and/or drawings of the specification.

According to the present invention in a first aspect, there is provided an apparatus for testing rings cut from pipes, comprising: a plurality of test chamber sections which, when placed together, define a test chamber for receiving the ring to be tested, the test chamber sections comprising at least a first test chamber section defining a first inner face of the test chamber and a second test chamber section defining an opposed second inner face of the test chamber, the first and second inner faces defining annuli arranged to contain the ring to isolate the inside of the ring from the outside; means for clamping the test chamber sections together to form the chamber; a fluid inlet port in one of the chamber sections to allow a pressurised fluid to be admitted to the chamber outside the ring when received in the chamber; and one or more sensors for measuring strain and deformation of the ring and fluid pressure, wherein the annuli are aligned with one another, are wider than the wall thickness of the ring to be tested, and are substantially entirely flat.

By such an arrangement, the ring is received between the first and second inner faces with the pressurised fluid admitted to an outer annulus outside the ring, which outer annulus is defined by the test chamber sections and the ring when the ring is received in the chamber.

The apparatus omits sealing elements associated with the first and second inner faces that are required in the referenced prior art. The annuli omit any sealing elements. The apparatus is rather arranged either for use with testing rings that are themselves provided with sealing elements or for use with testing rings without sealing elements, so as to provide an arrangement that omits all sealing elements between the testing rings and the apparatus. The arrangement in which the testing rings are provided with sealing elements is in direct opposition to the prior art. Both arrangements uniquely allow for the testing of pipes that are subject to cross-sectional distortion before failure.

The ring is contained by the first and second inner faces, since it lies therebetween during testing. The inner faces may form a seal with the ring for isolating the inside of the ring from the outside, as is the case in arrangements where the rings are provided with sealing elements. The inner faces may otherwise clamp the ring to isolate the inside of the ring from the outside, as is the case in arrangements where sealing elements are omitted. In this case, the clamping force will be such as not to prevent deformation/lateral movement of the test ring during testing.

When the testing rings are provided with sealing elements, sealing between the ring and the apparatus, and thereby testing pressure, is maintained with distortion of the ring. The first and second inner faces form a seal with the ring. The annuli are entirely flat and allow for the required movement, with the sealing elements moving with the ring as it distorts to maintain sealing against the entirely flat annuli.

To minimise friction, the annuli are preferably coated with lubricant. It is preferable that the lubricant prevents a metal to metal contact between the ring and the first and second inner faces of the apparatus. It is further preferable for minimising friction that the annuli are polished. They may be honed.

According to the present invention in a further aspect, there is provided an apparatus as detailed above in combination with a ring to be tested, the ring comprising substantially parallel end faces that are each provided with a sealing element.

The end faces are preferably grooved for receiving the sealing elements. The sealing elements are preferably resilient and may comprise O-rings, lips seals, or otherwise. Notably, the form of the sealing elements is not particularly limited. They may comprise any suitable resilient or self-energising sealing elements.

According to the present invention in a yet further aspect, there is provided a method of testing a ring cut from a pipe using the apparatus specified above, the method comprising:
  a. cutting the ring from the pipe;
  b. Fitting attachments to measure the strains and deformations of the ring;
  c. Fitting the ring into the apparatus with sealing elements in place on the end faces of the ring; and
  d. Applying pressure using the apparatus and recording the strain and deformation measurements.

The method may comprise the step of machining the end faces of the ring to form grooves for receipt of the sealing elements.

The arrangement providing the testing rings with sealing elements defies convention. Any modification to pipe rings has been strictly avoided in the prior art for fear of influencing the results of the test, particularly in the case of thick walled pipes for very deep water that require large sealing elements due to extremely high testing pressures. That is, any modifications to the ring have led to fears that the sample is no longer representative of the pipe joint it is cut from, and resultant fears over the reliability of the tests. Moreover, the polishing of the ring is far simpler than the polishing of annuli on the apparatus, as now uniquely proposed. Moreover, it must be noted that the failure mode of the thicker wall pipes to be tested with the prior art arrangements is not the same as for thinner walled pipes, leaving no motivation for further consideration, based on the prior art teachings.

The present inventors, through extensive research, established, however, that an arrangement as now presented, defying conventional thinking, was not only workable but presented significant benefits in some circumstances, particularly in the testing of thinner walled pipes. It was determined that the loss of material could be sufficiently small and that with it lying on the neutral axis, the effect on the relevant bending resistance could be almost negligible. O-ring grooves, for example, could be implemented without corrupting the integrity of the tests whilst maintaining sealing during cross-sectional distortion to allow for measurements that were not previously deemed possible. The prior art would lose sealing with cross-sectional distortion of a ring under testing.

When sealing elements between the testing rings and apparatus are omitted, as discussed above, there will be a controlled leakage of the pressurised fluid. The apparatus will preferably be provided with a sump for collection of fluid that has leaked past the ring from the outside of the ring. Whilst the annuli may be entirely flat, they may alternatively be substantially entirely flat by virtue of the provision of one or more radial grooves or isolated spaced projections, as discussed further below. The pressurised fluid preferably comprises oil or an alternative viscous fluid.

It is to be noted that the principles of the present invention may be applied to the testing of pipes having a wide range of diameters and wall thicknesses, and the present invention is not to be limited for use only with the thinner walled pipes referenced herein.

Non-limiting embodiments of the invention will now be discussed with reference to the following drawings.

Tests on long sections of individual pipe joints have shown that the deformations that lead to external collapse are uniform along the pipe. This observation is supported by theoretical studies and numerical modelling. The implication is that the occurrence of external pressure collapse will be the same for a ring cut from the pipe as for the complete joint length of pipe that is subjected purely to external pressure. The testing approach of the invention is therefore based on cutting short sections from a pipe and machining the ring to a uniform length. The ring is placed in a rigid frame that allows the machined faces of the ring to be sealed such that a pressure can be applied only to the outer circular surface of the ring. The inner circular surface of the ring is maintained at ambient pressure and thus is suitable for attachment of devices to measure the strains and deformations that are caused by the pressure on the outer circular surface of the ring.

By sealing with the end faces of the ring (or with a controlled leakage of fluid) the pressure can be constrained to be on the outer circular surface of the ring only. When sealing is applied or when sealing is omitted, the arrangement is configured, as discussed further below, such that the ring is not subject to substantial forces parallel to the end faces such that the deformations of the circular faces of the ring are impeded.

The pressure is applied from an external pump such that the pressure is increased or decreased by the addition or subtraction of a specified volume of fluid to or from the space surrounding the outer circular surface of the ring. This arrangement allows the radial deformations of the ring caused by the pressure on the outer cylindrical surface to increase or decrease in a controlled manner.

A typical test will involve the following steps:
a. cutting the ring from the pipe;
b. Fitting attachments to measure the strains and deformations of the ring;
c. Fitting the ring into the apparatus (with sealing elements in place on the end faces of the ring or not—dependent on the arrangement); and
d. Applying pressure using the apparatus and recording the strain and deformation measurements.

It may be useful to also plot a curve of pressure applied against maximum strain measured to detect the onset of an accelerating non-linear reduction in ring diameter with increasing pressure that is independent of any leakage of hydraulic fluid past the seals.

Figure 1:
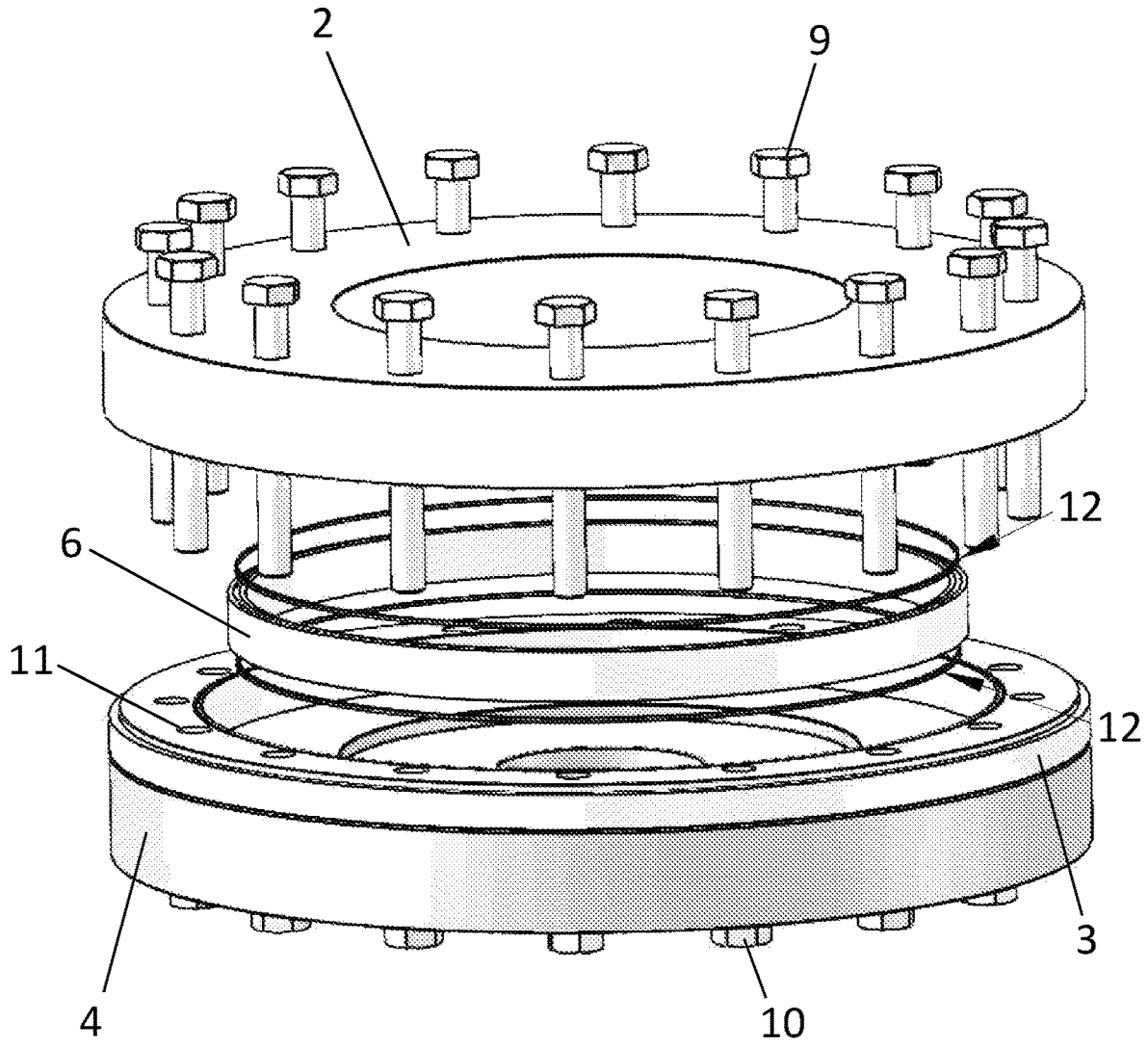
FIG. 1 shows an exploded perspective view of a testing apparatus according to a first embodiment and a ring to be tested.
Figure 2:
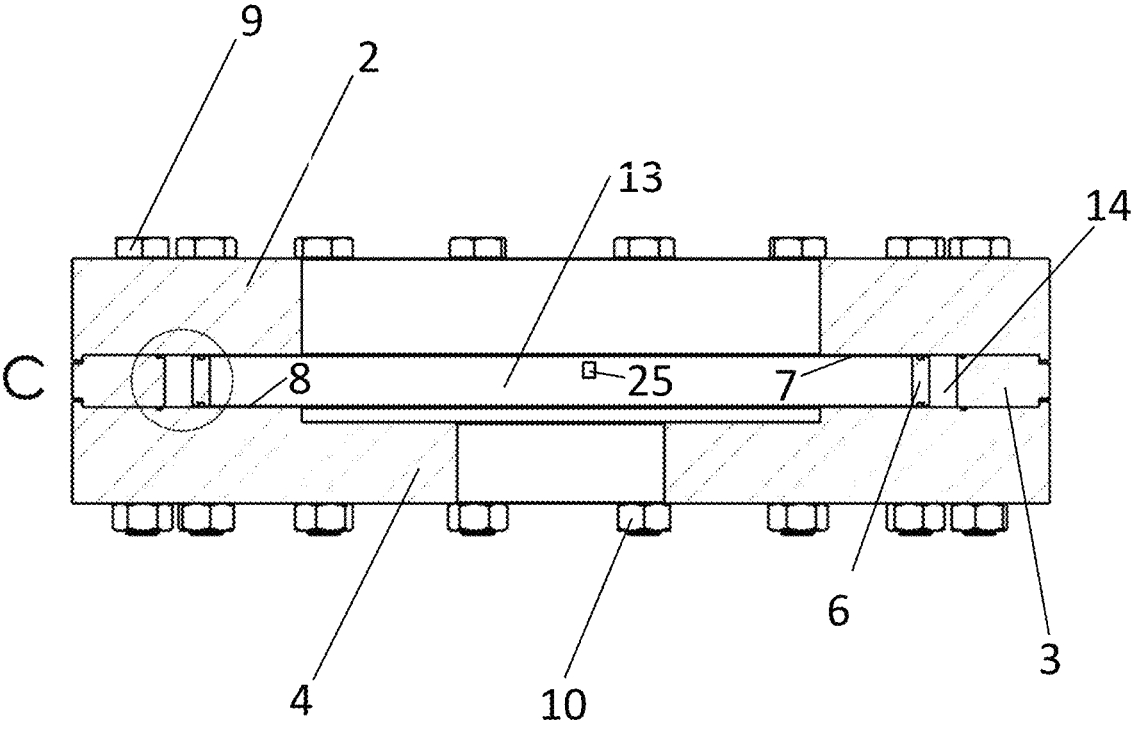
FIG. 2 shows a sectional view of the testing apparatus of FIG. 1 in an assembled state with the test ring in situ, ready for testing.
Figure 3:
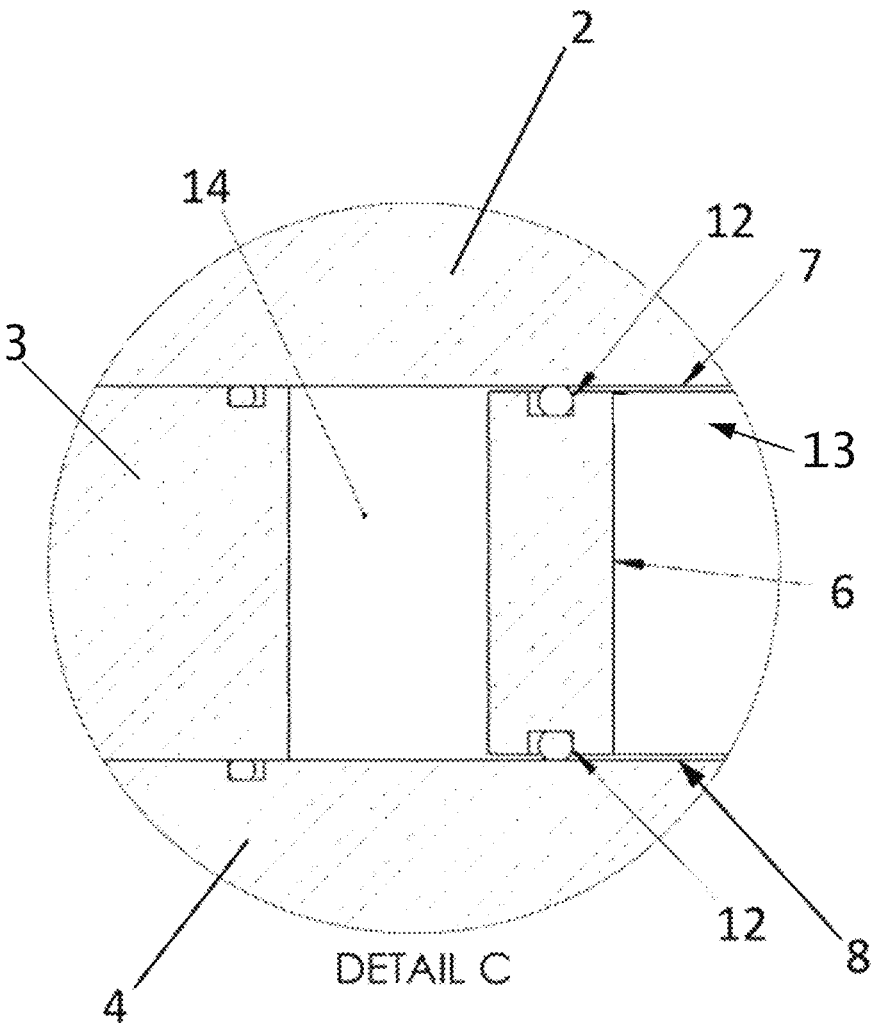
FIG. 3 shows detail C of FIG. 2.

FIG. 1 shows an exploded perspective view of an apparatus according to a first embodiment of the invention along with a ring cut from a pipe forming a test piece. FIGS. 2 and 3 show the apparatus set up with the ring in place for testing. It is to be noted that FIGS. 2 and 3 are schematic and do not illustrate the true tolerances between the depicted elements, for ease of illustration.

As shown, the apparatus comprises a plurality of test chamber sections 2, 3, 4 which, when placed together (as best seen in FIG. 2), define a test chamber for receiving the ring 6 to be tested. The test chamber sections 2, 3, 4 comprise at least a first test chamber section 2 defining a first inner face 7 of the test chamber and a second test chamber section 4 defining an opposed second inner face 8 of the test chamber. The first and second inner faces 7, 8 define annuli arranged to form a seal with the ring to isolate the inside of the ring from the outside. Means 9, 10 for clamping the test chamber sections together to form the chamber are provided. Whilst the clamping means may take any suitable form, as will be readily appreciated by those skilled in the art, in the present exemplary arrangement they comprise bolts 9, which are received by suitable openings 11 passing through the test chamber sections 2, 3, 4, and nuts 10. The clamping means are not to be limited as such. A fluid inlet port (not shown) is provided in one of the chamber sections to allow a pressurised fluid, also referred to as a pressurized fluid, to be admitted to the chamber outside the ring when received in the chamber. One or more sensors, such as sensor 25, are provided for measuring strain and deformation of the ring 6

The annuli are aligned with one another. They are wider than the wall thickness of the ring to be tested. They are, uniquely, entirely flat. The annuli themselves are free from any sealing members. They define constant uninterrupted flat surfaces.

The annuli will be configured in accordance with the pipe to be tested, with their diameter and width set accordingly. The annuli may, for example, have an inner diameter that is 5 to 10 cm smaller than the inner diameter of the ring to be tested and an outer diameter that is 5 to 10 cm larger than the outer diameter of the ring to be tested.

The annuli are preferably polished and coated with lubricant. The annuli may be honed.

The ring to be tested comprises substantially parallel end faces that are each provided with a sealing element 12. The sealing elements 12 in the present arrangement comprise O-rings. In alternative arrangements, they may comprise lip seals or any alternative form of pressure-energised pressure containing seal.

The first and second inner faces 7, 8 of the apparatus are engaged by the sealing elements 12 of the test ring 6 to form an outer annulus 14 accessible by a supply of pressurised hydraulic test fluid through an appropriate inlet port (not shown). A central void 13 inside the test ring 6 is preferably open to atmosphere as shown, wherein ready access is provided for the attachment of any instrumentation/cabling for strain gauges (not shown) on the inner cylindrical surface of the test ring 6.

The force with which the test chamber sections 2, 3, 4 are held together (and thereby the force applied to the test ring/sealing elements by the first and second inner faces/annuli) is sufficient to make the outer annulus 14 pressure tight internally and externally against the sealing elements 12. The tolerances are selected, as will be readily appreciated by those skilled in the art and discussed further below, such that no leakage occurs from the outer annulus 14 into the central void 13 whilst at the same time avoiding undue restraining friction on the radial movement inwards of the ring 6 outer diameter under hydraulic loading.

Further consideration will now be given to tolerances and lubrication and to the movement of a test ring during cross-sectional distortion during testing.

The apparatus is configured to uniquely maintain a leak-tight seal between the test ring and the test apparatus whilst allowing for cross-sectional distortion of the test ring. To render testing as accurate as possible, it is desirable to minimise metal-to-metal contact between the test specimen and the test apparatus, and limit friction between the sealing elements and the test apparatus surfaces.

To limit friction, as will be appreciated by those skilled in the art, it is desirable to: avoid excessive static compression of the sealing elements, since this increases contact pressure and hence friction; avoid excessive clearance gap, since this can allow the sealing elements to extrude into the gaps under pressure and cause a "wedging" effect; provide effective lubrication; and implement suitable tolerances.

The following tolerances are relevant:
1. Parallelism tolerance of the first and second inner faces 7, 8 of the apparatus and the upper and lower faces of the test ring.
2. Flatness tolerance of the first and second inner faces 7, 8 of the apparatus and the upper and lower faces of the test ring.
3. Surface finish tolerance of the annuli.

The measures to limit friction will be selected accordingly, factoring in the ring to be tested and the test parameters to be implemented.

In an exemplary, non-limiting, arrangement, for a pipe having a diameter of 42 inches (1.07 m) and configured for use in depths of between 200 to 500 m, the following configuration may be adopted:

Clearance gap between test ring and each of the first/second inner faces 7, 8

1.5 thou (0.038 mm) to 4 thou (0.127 mm).

Initial compression of each sealing element (O-ring)

10 to 20%.

Flatness and parallelism tolerances

Configured for maintenance of the clearance gap and sealing element compression tolerances as detailed above during movement of the test ring during testing.

Figure 4:
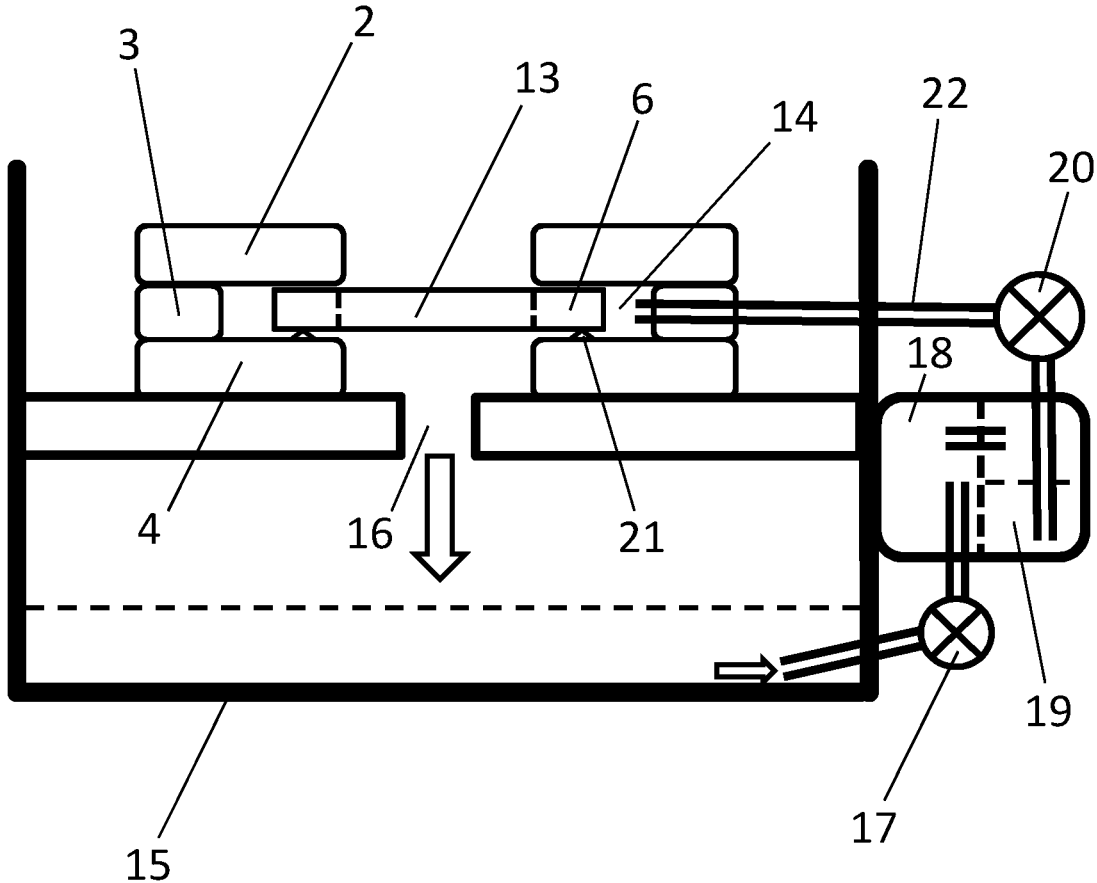
FIG. 4 shows a sectional view of a testing apparatus according to a second embodiment in an assembled state with a test ring in situ, ready for testing.

FIG. 4 shows a view of an apparatus according to a second embodiment set up with a ring in place for testing. It is to be noted that FIG. 4 is again schematic and does not illustrate the true tolerances between the depicted elements, for ease of illustration.

According to the second embodiment, the sealing elements 12 are omitted from the test ring. In this embodiment, the apparatus is substantially identical to that discussed with reference to the first embodiment, as depicted in FIGS. 1 to 3, but relies upon controlled leakage of the pressurised fluid rather than sealing. Fluid in the annulus 14 will be replenished at a suitable rate, and in dependence on the controlled leakage, for a controlled increase of pressure. Common features between the present embodiment and the first embodiment will not be discussed at length, wherein the discussion above of any such features is directly applicable to this embodiment, as will be appreciated by those skilled in the art.

The apparatus adds a sump 15 for collection of fluid that has leaked from the annulus 14 past the test ring 6 and into the region of the central void 13. The pressurizing fluid escaping through nominal clearances at the top and bottom of the specimen ring drains through one or more drain holes 16 into the sump, as indicated by the arrow in FIG. 4.

It is preferable, as shown in the present arrangement, that the fluid is recycled by the apparatus. For such purposes there may be provided a low pressure pump 17, a conditioning tank 18 configured to de-aerate and filter the fluid. The conditioning tank preferably feeds a supply tank 19, which may be integral with the conditioning tank, as shown, or may be provided separately thereto. A high pressure pump 20 injects pressurised fluid into the annulus through a pressurising line 22 in a controlled manner to keep the specimen under increasing pressure.

As must be appreciated, in alternative arrangements, the fluid need not be recycled and the apparatus may be modified accordingly.

By suitable setting of the tolerances, as listed above at 1, 2 and 3, the leakage of the pressurised fluid can be controlled.

The annuli may be entirely flat, as with the first embodiment. In other embodiments, as alluded to above, the annuli may be provided with one or more radial grooves and/or one or more projections. The grooves/projections are preferably isolated/spaced from one another.

In the arrangement of FIG. 4, there are provided a plurality of projections 21. These preferably comprise three or more small pointed or sharp-edged lands to support the specimen at the preferred tolerance away from the bottom annuli. They are configured, as will be appreciated by those skilled in the art, so as not to impact the test results to any significant degree. The provision of the lands ensures that the pressurizing fluid flows over both the upper and lower surfaces of the specimen ring.

As in the case of the first embodiment, movement of the test ring does not impact the testing, in contrast to prior art arrangements.

Figure 5:
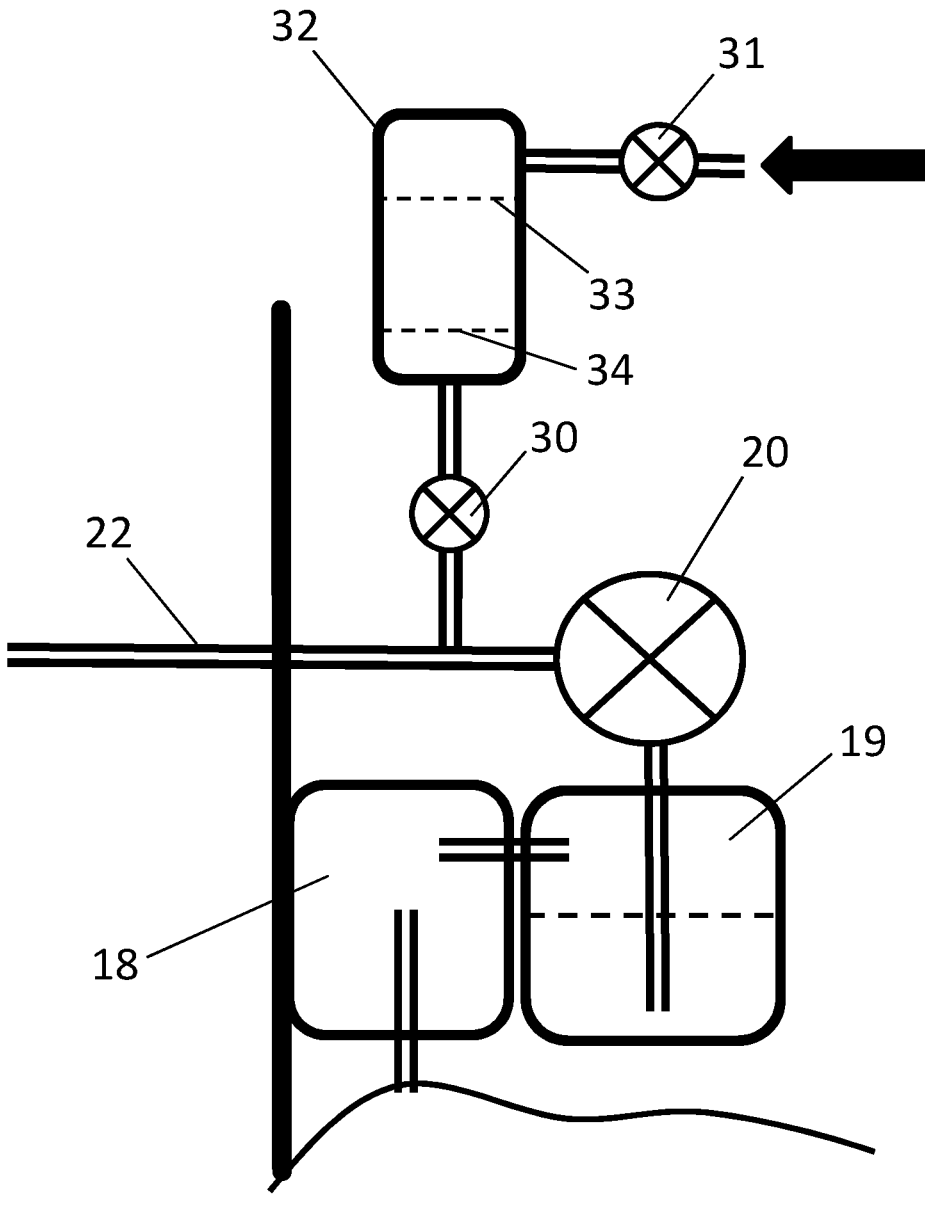
FIG. 5 shows another embodiment of a sectional view of the testing apparatus of FIG. 4 with an accumulator.

With reference to FIG. 5, there is shown a further, optional arrangement, which may be applied in respect of any of the above described arrangements, provided with seals or omitting seals. This represents the optional introduction of an accumulator 32 into the pressurization system to permit variation in the "hydraulic stiffness" of the pressurization system.

FIG. 5, as will be appreciated, shows a schematic arrangement for illustration purposes only. It shows the introduction of the accumulator 32 into the arrangement of FIG. 4 (shown with the option of separate conditioning and supply tanks 18, 19). As stated, however, an accumulator 32 may be introduced into any of the above described arrangements, including the arrangements discussed with reference to FIGS. 1 to 4.

The introduction of the accumulator 32 provides a means to vary the stiffness of the pressurizing system to enhance the visibility of a "permanent distortion limit", i.e. when the non-recoverable plastic strain caused by a standard increment of pressure exceeds a pre-defined acceptance level. This is of value where such permanent distortion to the pipe cross-section is the chosen practical acceptance threshold beyond which the level of permanent distortion of the pipe cross-section is considered to be unacceptable for practical reasons even though pipe integrity has not been breached.

As will be clear from the discussion that follows, the form of the accumulator 32 is not particularly limited. Any conventional gas-backed accumulator, for example, may be implemented as will be readily appreciated by those skilled in the art.

With reference to the arrangement of FIG. 5, when valve 30 is closed, the system has unchanged maximum stiffness and pressure increments are relieved by very small strains. Opening valve 30 and charging the accumulator 32 with compressed gas (such as, but not limited to any one of dry air, nitrogen or carbon dioxide), by opening the valve 31, to, say, a first level (indicated by broken line 33), provides some more system flexibility where a standard increment of pressure will require some more strain to relieve. Increasing the gas pressure further will drive down the fluid to, say, a second level (indicated by broken line 34), where the greater gas volume provides even more flexibility, whereby a standard system pressure rise, matched by a gas pressure rise to sustain the second level, will require even more strain of the specimen ring to relieve. This means that the sensitivity with which an operator can detect the "permanent distortion limit" described below may be usefully enhanced, permitting a quicker and easily managed non-destructive testing process.

As will be appreciated by those skilled in the art, the accumulator may take any suitable known form.

Methods and apparatus according to the invention demonstrate a number of advantages over previous techniques. They allow testing of a representative sample of test rings taken from all the line pipe joints required for a long pipeline to give direct physical quantified evidence of the capacity of each of these specimens to resist external hydrostatic collapse. The collapse tolerance of each specimen test ring can be confidently held to be representative of the collapse tolerance of the joint from which it is cut. Use of the invention in the manner described can permit a reduction in the factor used currently in the design process to increase the wall thickness of the whole line. The joint from which each test ring is cut can still be utilized as a production joint and is not wasted. The net result can be a highly significant reduction in pipeline wall thickness that will provide improved commercial availability of line pipe and significant cost savings. Over the referenced prior art, they uniquely allow the testing of pipes that suffer what is commonly characterised as elastic buckling collapse under extreme hydrostatic loading. They further provide for accurate repeatable operation by less-skilled individuals, and allow for a higher throughput of test specimens. This allows for the implementation of testing of many samples at source, in a pipe mill as part of the production process, or otherwise. The disclosed apparatus also allows for multiple tests to be performed without any component being changed.

Numerous alternative arrangements and modifications to the apparatus as described herein will be readily appreciated by those skilled in the art within the scope of the appended claims.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. An apparatus for testing rings cut from pipes, comprising:
   a plurality of test chamber sections which, when placed together, define a test chamber for receiving the ring to be tested, the test chamber sections comprising at least a first test chamber section defining a first inner face of the test chamber and a second test chamber section defining an opposed second inner face of the test chamber, the first and second inner faces defining annuli arranged to contain the ring to isolate the inside of the ring from the outside;
   means for clamping the test chamber sections together to form the chamber;
   a fluid inlet port in one of the chamber sections to allow a pressurized fluid to be admitted to the chamber outside the ring when received in the chamber; and
   one or more sensors for measuring strain and deformation of the ring and fluid pressure, wherein the annuli are aligned with one another, are wider than the wall thickness of the ring to be tested, and are entirely flat.

2. The apparatus of claim 1, wherein the annuli are coated with lubricant.

3. An apparatus as claimed in claim 1, wherein the annuli are honed.

4. The apparatus of claim 1 further comprising:
   a pressurization system for providing the pressurized fluid to the fluid inlet port, wherein the pressurization system comprises an accumulator.

5. The apparatus of claim 1 further comprising:
   a sump for collection of any pressurized fluid that leaks to the inside of the ring from the outside.

6. The apparatus of claim 5 further comprising a pump for recycling the pressurized fluid from the sump.

7. The apparatus of claim 1, wherein the annuli comprise one or more radial grooves and/or one or more projections.

8. The apparatus of claim 7, wherein the grooves/projections are spaced from one another around the annuli.

9. The apparatus of claim 1, wherein the annuli are polished.

10. A method of testing a ring cut from a pipe, the method comprising:
   a. cutting the ring from the pipe, the ring having end faces;
   b. fitting attachments to measure the strains and deformations of the ring;
   c. fitting the ring into an-apparatus, the apparatus including:
   a plurality of test chamber sections which, when placed together, define a test chamber for receiving the ring, the test chamber sections comprising at least a first test chamber section defining a first inner face of the test chamber and a second test chamber section defining an opposed second inner face of the test chamber, the first and second inner faces defining annuli arranged to contain the ring to isolate the inside of the ring from the outside;
   means for clamping the test chamber sections together to form the chamber:
   a fluid inlet port in one of the chamber sections to allow a pressurized fluid to be admitted to the chamber outside the ring when received in the chamber; and
   one or more sensors for measuring strain and deformation of the ring and fluid pressure, wherein the annuli are aligned with one another, are wider than the wall thickness of the ring to be tested, and are entirely flat;
   wherein the fitting into the apparatus includes the first inner face against a first end face of the ring and the second inner face against a second inner face of the ring; and
   d. applying pressure using the apparatus and recording and deformation measurements.

11. The method of claim 10, wherein an inner diameter of each annuli is 5 to 10 cm smaller than an inner diameter of the ring to be tested and an outer diameter of each annuli is 5 to 10 cm larger than an outer diameter of the ring to be tested.

12. A method of testing a ring cut from a pipe, the method comprising:
   a. cutting the ring from the pipe;
   b. fitting attachments to measure the strains and deformations of the ring;
   c. fitting the ring into an apparatus, the apparatus comprising:
   a plurality of test chamber sections which, when placed together, define a test chamber for receiving the ring, the test chamber sections comprising at least a first test chamber section defining a first inner face of the test chamber and a second test chamber section defining an opposed second inner face of the test chamber, the first and second inner faces defining annuli arranged to contain the ring to isolate the inside of the ring from the outside;
   means for clamping the test chamber sections together to form the chamber;

a fluid inlet port in one of the chamber sections to allow a pressurized fluid to be admitted to the chamber outside the ring when received in the chamber; and one or more sensors for measuring strain and deformation of the ring and fluid pressure, wherein the annuli are aligned with one another, are wider than the wall thickness of the ring to be tested, and are entirely flat; and d. applying pressure using the apparatus and recording the strain and deformation measurements.

13. The method of claim 12, wherein the ring comprises substantially parallel end faces that are each provided with a sealing element.

14. The method of claim 13, wherein the end faces are grooved for receiving the sealing elements.

15. The method of claim 13, wherein the sealing elements are resilient.

16. The method of claim 13, wherein the sealing elements comprise O-rings or lip seals.

17. The method of claim 13, wherein D/T>25, where D is the outer diameter of the ring and T is the wall thickness of the ring.

18. The method of claim 12, wherein the ring comprises substantially parallel end faces that are entirely flat.

19. The method of claim 12, wherein the end faces omit any sealing element.

* * * * *